United States Patent [19]

Walker

[11] Patent Number: 4,738,122
[45] Date of Patent: Apr. 19, 1988

[54] REFRIGERANT EXPANSION DEVICE WITH MEANS FOR CAPTURING CONDENSED CONTAMINANTS TO PREVENT BLOCKAGE

[75] Inventor: Graham Walker, Scottsdale, Ariz.

[73] Assignee: General Pneumatics Corporation, Orange, N.J.

[21] Appl. No.: 947,526

[22] Filed: Dec. 29, 1986

Related U.S. Application Data

[62] Division of Ser. No. 793,268, Oct. 31, 1985, Pat. No. 4,631,928.

[51] Int. Cl.[4] .............................................. F25B 19/00
[52] U.S. Cl. ................................. 62/514 JT; 62/303;
62/527; 137/546; 137/614.11
[58] Field of Search ................. 62/303, 474, 475, 527, 62/528, 514 JT; 137/614.11, 546

[56] References Cited

U.S. PATENT DOCUMENTS

| | | | |
|---|---|---|---|
| 2,319,498 | 5/1943 | Gerard | 62/527 |
| 2,675,829 | 4/1954 | Livers | 137/614.11 |
| 2,909,908 | 10/1959 | Pastuhov et al. | 62/528 |
| 3,320,755 | 8/1967 | Jersen et al. | 62/45 |
| 3,457,730 | 11/1969 | Berry et al. | 62/223 |
| 3,517,525 | 7/1970 | Campbell | 62/222 |
| 3,827,252 | 8/1974 | Chovet et al. | 62/222 |
| 3,885,401 | 5/1975 | Banike | 62/303 |
| 4,002,039 | 6/1977 | Cramer et al. | 62/224 |
| 4,028,907 | 4/1977 | Herrington et al. | 62/222 |
| 4,056,745 | 11/1977 | Eckels | 62/514 JT |
| 4,177,650 | 3/1979 | Campbell | 62/222 |
| 4,206,760 | 6/1980 | Davis | 128/303 |
| 4,237,699 | 9/1980 | Longsworth | 62/514 JT |
| 4,278,090 | 7/1981 | van Gerven | 62/514 JT |
| 4,419,867 | 10/1983 | Albagnac | 62/514 JT |
| 4,468,935 | 9/1984 | Albagnac | 62/514 JT |
| 4,484,002 | 5/1984 | Klee et al. | 236/101 R |

FOREIGN PATENT DOCUMENTS 515003 9/1976 U.S.S.R. .
700756 11/1979 U.S.S.R. .
757814 8/1980 U.S.S.R. .

Primary Examiner—Ronald C. Capossela
Attorney, Agent, or Firm—Shapiro and Shapiro

[57] ABSTRACT

A refrigerant expansion device such as a Joule-Thomson expander has a surface with grooves or recesses which capture contaminants that condense from the refrigerant flow in the device, thereby avoiding blockage of the device by the condensed contaminants.

21 Claims, 2 Drawing Sheets

REFRIGERANT EXPANSION DEVICE WITH MEANS FOR CAPTURING CONDENSED CONTAMINANTS TO PREVENT BLOCKAGE

CROSS-REFERENCE TO RELATED APPLICATION

This application is a division of U.S. patent application Ser. No. 793,268 filed Oct. 31, 1985, now U.S. Pat. No. 4,631,928.

FIELD OF THE INVENTION

This invention pertains generally to refrigeration systems and is more particularly concerned with an improved refrigerant expansion device having means for capturing contaminants condensed from the refrigerant fluid so that blockage of the device by such contaminant is avoided. The invention is especially useful in cryogenic gas liquefaction systems employing Joule-Thomson expansion devices.

DESCRIPTION OF THE PRIOR ART

Gases may be cooled below their liquefaction temperatures by expanding from a high pressure to a low pressure in a constant enthalpy process known as Joule-Thomson expansion. When the temperature of the gas just prior to expansion is sufficiently below the inversion temperature of the gas (the temperature below which expansion results in a decrease in temperature), the gas undergoes a phase change upon expansion, forming two distinct fluids—saturated liquid (the useful product) and saturated vapor. The expansion of gases in this manner is generally effected by a so-called Joule-Thomson expansion valve.

The present invention is especially applicable to miniature liquefiers of the Linde-Hampson class, which customarily employ cryostats including a Joule-Thomson expansion valve made integral with a final stage contra-flow, recuperative heat exchanger (usually referred to as a Giaque-Hampson heat exchanger). FIG. 1 illustrates a conventional cryostat of the foregoing type. The cryostat, designated by reference numeral 10, includes an elongate mandrel or core 12 about which a length of fine bore finned tubing 14 is helically wound. The tube 14 terminates at an end 16 having a fixed opening which is partially restricted and which constitutes the Joule-Thomson expansion orifice. The wound tubing 14 and Joule-Thomson orifice 16 are contained in a sheath 18 closed at one end 20 which corresponds to the cold end of the device. Usually the sheath will be incorporated as part of a dewar vessel and the previously described components will be inserted therein.

In operation of cryostat 10, high pressure coolant fluid (gas) is supplied to expansion orifice 16 through tubing 14. The non-liquefied portion of the coolant fluid flows back along the heat exchanger (to the left in FIG. 1) to pre-cool the incoming gas and is then recycled through the cooling system. Spacer strands 22 are ordinarily wrapped about the core 12 and the inner periphery of the sheath 18, between adjacent passes of the finned tubing 14 so that the non-liquefied coolant flows between the fins of the tubing 14 for good heat exchange. Liquefied coolant is removed (as through an opening in the sheath) as useful product.

Cool-down of the device just described takes place basically as follows. Initially, assuming the incoming high pressure gas is at a temperature below the inversion temperature, the gas will expand through the Joule-Thomson orifice to a lower temperature. At start-up the initial temperature of the gas is not sufficiently low to form liquid. All of the expanded gas will thus be returned along the finned tubing heat exchanger for recycling. As the cool expanded gas flows along the heat exchanger, it absorbs heat from further incoming gas which is thus pre-cooled. The further gas will therefore expand from a lower temperature than did the initial gas and will therefore attain a lower post-expansion temperature. It then pre-cools yet additional incoming gas to an even lower pre-expansion temperature, and so on. This bootstrapping process continues until the incoming gas is pre-cooled sufficiently below the inversion temperature that a liquid component is formed, whereafter the system reaches equilibrium with the liquid being removed and additional gas being supplied as makeup.

Conventional fixed orifice Joule-Thomson devices such as that in FIG. 1 suffer from two significant disadvantages in practice. First, due to the fixed expansion orifice, such devices are characterized by slow initial cool-down and poor temperature regulation. More particularly, with a fixed orifice the fluid mass flow rate increases as cool-down progresses. Increasing flow, however, is precisely opposite the criteria for rapid cool-down and good temperature regulation (i.e., maintaining an even temperature). To achieve these objectives it is necessary that the initial flow rate be at a maximum (for rapid cooling), followed by a reduction in flow as the temperature approaches design conditions, and even temporary stoppage of the flow if necessary to maintain the design temperature.

A second major problem with fixed orifice Joule-Thomson systems is clogging caused by the accumulation of condensed contaminants from the coolant fluid stream. More particularly, as the incoming gas expands through the Joule-Thomson orifice, contaminants contained in the gas stream condense, freeze and then accumulate in the orifice—eventually leading to complete blockage of the flow. The flow is thereafter restored when the temperature of the device rises sufficiently that the contaminants melt and are discharged by the pressure of the coolant gas.

A number of Joule-Thomson expanders have been proposed in the prior art which include mechanisms for throttling the gas flow to improve upon the temperature characteristics of fixed orifice devices. Temperature responsive needle valves are perhaps the most commonly proposed mechanism for this purpose. Various arrangements have been devised to impart the required temperature sensitivity to the needle valve, including, for example, temperature responsive bellows arrangements and assemblies incorporating structural components having different coefficients of thermal expansion. Generally, these devices have been quite complex, due largely to the required structure for moving the needle element into and out of the expansion opening. These devices also frequently exhibit poor temperature sensitivity. Moreover, needle valve type devices are susceptible to blockage by condensed contaminants.

SUMMARY OF THE INVENTION

In one of its principal aspects, U.S. Pat. No. 4,631,928 was concerned with an expansion valve and a cryostat designed to eliminate the problems of slow cool-down and poor temperature regulation by the use of a self-regulated, temperature-responsive construction based on materials having different coefficients of thermal expansion. The parent application also disclosed another important concept—in particular, an expansion device incorporating special means for capturing contaminants condensed from the refrigerant stream to avoid blockage of the expansion orifice. It is this latter concept with which the present application is especially concerned.

More particularly stated, in one of its broad aspects, the present invention provides an improved refrigerant expansion device in a refrigeration system of the type wherein a refrigerant fluid is compressed and subsequently expanded to effect cooling. The device includes means defining an annular passageway having an upstream end into which the refrigerant fluid is introduced under pressure and a downstream end terminating at an annular expansion opening through which the introduced fluid is expanded, the passageway being subject to accumulation therein of condensed contaminants from the refrigerant fluid. The device further includes means disposed along the passageway for capturing the condensed contaminants such that the passageway does not become blocked by such contaminants.

In another of its aspects, the present invention provides cryogenic cooling apparatus including a Joule-Thomson expansion device having an inner member and an outer member surrounding the inner member, with an outer peripheral surface of the inner member and an inner peripheral of the outer member defining an annular passageway. The passageway has an inlet toward an upstream end thereof into which high pressure refrigerant fluid is to be introduced and an annular outlet orifice at a downstream end thereof through which the introduced fluid is to be expanded. The device further includes recess means formed in the respective peripheral surface of at least one of the aforementioned members for capturing contaminants which condense out of the refrigerant fluid, thereby inhibiting blockage of the passageway by the condensed contaminants.

In yet another of its broad aspects, the subject invention provides an improved refrigeration expansion device of the type in which a refrigerant fluid flows along a surface which leads to an expansion orifice from which the fluid is expanded. In the improved device, this surface has recess means formed therein for capturing condensed contaminants from the fluid as the fluid passes along the surface.

BRIEF DESCRIPTION OF THE DRAWINGS

The subject invention and its advantages will be appreciated more fully from the following detailed description which is given in the context of a self-regulated Joule-Thomson cryostat of the type described in the parent application. The description refers to the accompanying drawings, wherein.

DESCRIPTION OF THE PREFERRED EMBODIMENTS

Figure 1:
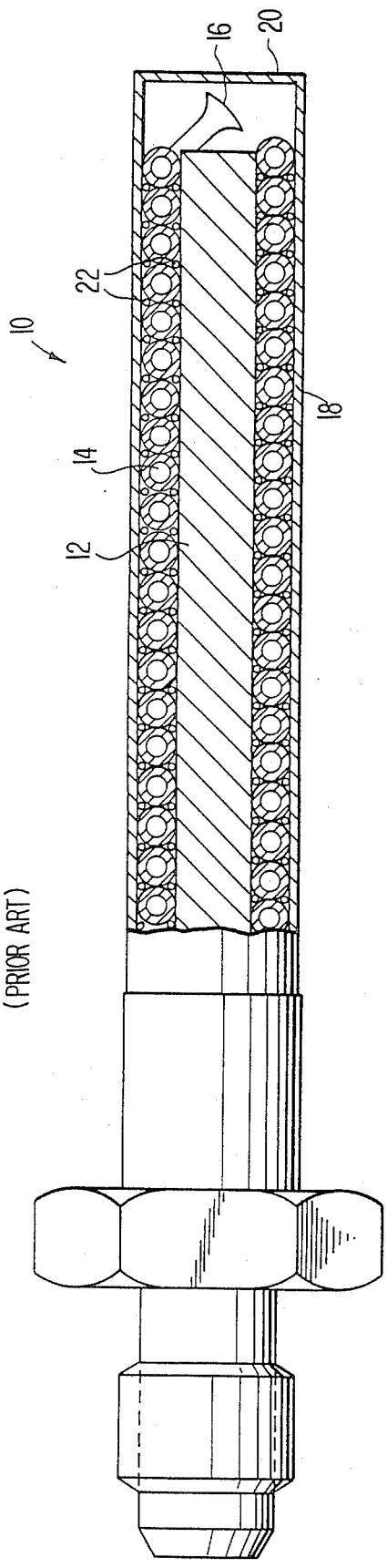
FIG. 1 is a side view, shown partly in section, of a cryostat in accordance with the prior art.
Figure 2:
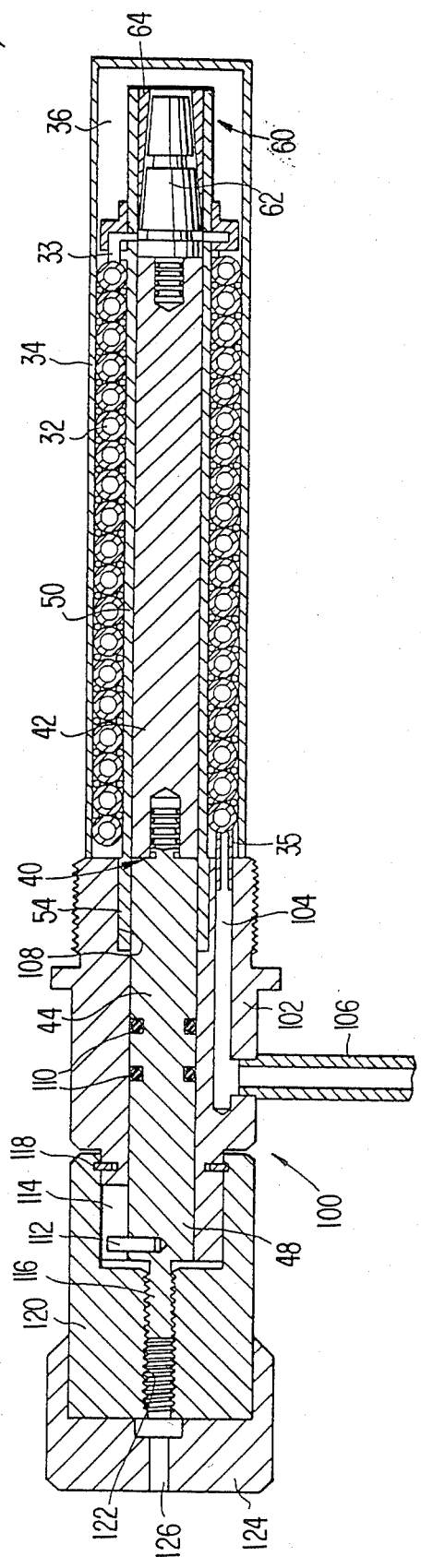
FIG. 2 is a cross-sectional side view of a cryostat in accordance with the invention.

FIG. 2 depicts a cryostat 30 incorporating a Joule-Thomson expansion valve 60 in accordance with the present invention. In the illustrative embodiment expansion valve 60 includes a substantially frusto-conical valve member 62 supported at an end of first means in the form of elongate core shaft 40 of substantially cylindrical cross section. For purposes which will become apparent hereinafter the core shaft 40 includes a main section 42 having the valve member 62 and an extension 44 supported at its opposite ends, as shown.

Expansion valve 60 further includes a tapered valve seat 64 supported circumferentially adjacent a lengthwise portion of valve member 62 by second means in the form of a tubular sheath 50 slidably received over and coaxial with the core shaft 40. Sheath 50 surrounds core shaft 40 along the major portion of the core shaft length, as shown. Core shaft 40 and sheath 50 constitute, in part, a mandrel about which finned coolant fluid tubing 32 is wrapped and secured in a conventional manner. One end 33 of tubing 32 is connected to the expansion valve 60 in a manner to be described later. As will be explained in detail hereinafter, the core assembly constituted by shaft sections 42 and 44 and valve member 62 is constructed to have a lower effective coefficient of thermal expansion than the sheath 50 in order to render valve 60 adjustable in response to the temperature of the fluid expanded from the valve 60.

With continued reference to FIG. 2, it will be seen that the heat exchanger and expander portions of cryostat 30 are contained within an outer sheath 34 in the form of a cylinder which is closed at one end. The closed end of outer sheath 34 defines an expansion chamber 36 for gas exiting valve 60 and from which liquefied coolant gas may be recovered by suitable conventional means (not shown). The non-liquefied portion of the expanded coolant gas flows back along the wrapped tubing 32, between sheath 50 and outer sheath 34, and absorbs heat from incoming high pressure gas within the tubing, whereby the incoming gas is pre-cooled prior to expansion. The expanded gas then exits from an outlet (not shown) at the open end of the outer sheath 34.

It will be appreciated that in practice, outer sheath 34 will ordinarily be incorporated into a dewar vessel employed in conjunction with the cryostat 30 for containing the liquefied product and that the heat exchanger and Joule-Thomson expander portions of the cryostat will be inserted into the sheath, which is illustrated herein to facilitate understanding of the invention.

Figure 3:
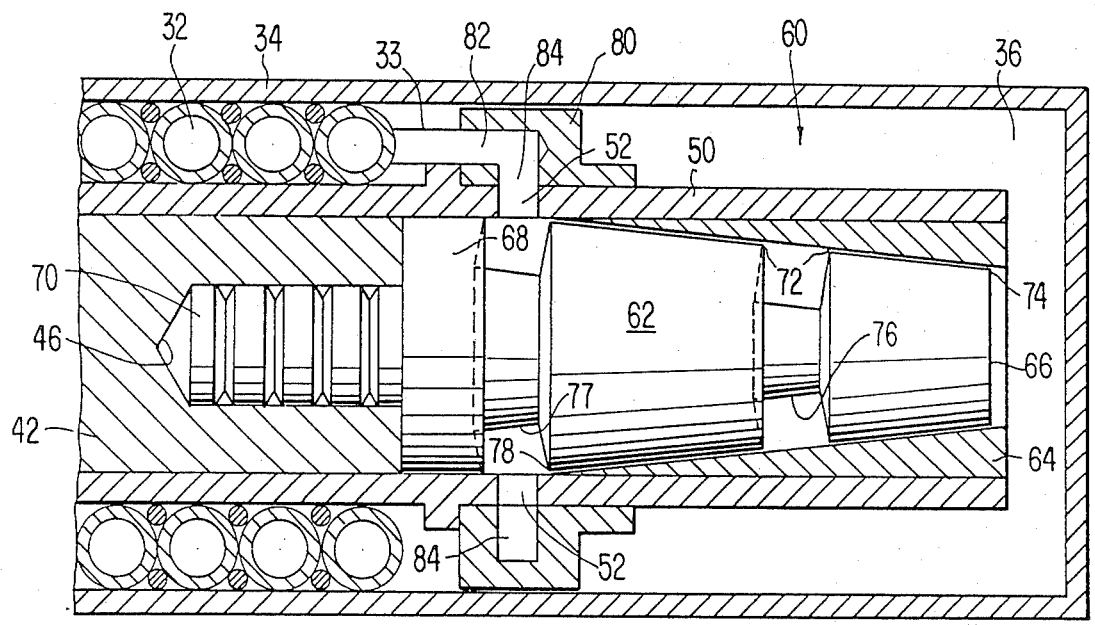
FIG. 3 is an enlarged cross-sectional view of the expansion valve portion of the cryostat of FIG. 2.

The structural details of Joule-Thomson expansion valve 60 will now be described. Referring additionally to FIG. 3, the general frusto-conical valve member 62 will be seen to converge toward a free extremity 66 thereof from a base portion 68 which is attached to main section 42 of core shaft 40. The outer periphery of the base portion 68 of the valve member is non-tapered to conform to the inner circumference of tubular sheath 50, with the free extremity 66 being of reduced cross dimension relative to the base portion 68. Valve member 62 is attached to the main section 42 of the core shaft by means of an a pin 70 projecting axially from the base portion 68 and received in a corresponding socket 46 at the associated end of core shaft section 42. Pin 70 may be externally grooved, as shown, to facilitate fixation of the valve member 62 to core shaft section 42 (e.g., to receive an epoxy adhesive). Valve member 62 may also be formed integrally with core section 42.

Valve seat 64 essentially has the form of an annular wedge which converges from a wider cross dimension toward base portion 68 of the valve member to a narrower cross dimension toward free extremity 66 of the valve member. To simplify manufacturing of the valve 60, the valve seat 64 may be formed as a separate element which is inserted and secured within the inner periphery of sheath 50, although the seat may, of course, be formed integrally with sheath 50.

In accordance with the invention as shown in FIG. 3, valve member 62 and valve seat 64 are arranged with their opposing peripheral surfaces spaced slightly apart to define an annular passageway 72 which converges toward free extremity 66 of valve member 62 and terminates at an annular expansion opening 74 adjacent the free extremity 66 of the valve member. Passageway 72 of the illustrative embodiment is interrupted along its length by one of a pair of circumferential grooves 76, 77 which are cut into the external peripheral surface of valve member 62. The grooves 76, 77 (which, in the form shown, are cut substantially perpendicular to the valve member surface) serve two very important practical purposes which will be discussed shortly.

To permit the introduction of high pressure gas into valve 60, sheath 50 includes peripheral openings 52 in communication with an upstream end 78 of converging annular passageway 72. In the form shown, the openings 52 are aligned with spoiler groove 77 adjacent end 78 of the passageway 72. Coolant gas is fed into the aligned groove, and thus the passageway, through openings 52 by means of an annular high pressure adapter 80 secured to the outer periphery of sheath 50. High pressure adapter 80 is provided with an opening 82 wherein end 33 of tubing 32 is received, and an internal peripheral channel or groove 84 in communication with both opening 82 of the adapter and openings 52 of the sheath.

Referring again to FIG. 2, it will be seen that at the end of the cryostat 30 opposite expander 60 (i.e., at the "warm" end of the cryostat) the ends of core shaft 40 and sheath 50 are connected to a calibration assembly 100 which holds the core shaft and sheath in selected relative axial positions. The selected positions of the core and sheath are adjustable in a manner to be described later.

Given the basic structure of cryostat 30 as described hereinabove, the purpose of constructing the core assembly 42, 44, 62 so as to have a lower effective coefficient of thermal expansion than sheath 50 will be readily understood. In particular, it will be appreciated that as the temperature of the cryostat 30 decreases, the sheath will contract more rapidly than the core assembly. As a result, valve seat 64 is drawn axially over valve member 62 in the direction of base portion 68 (to the left in FIGS. 2 and 3). The clearance between the opposing peripheral surfaces of valve member 62 and valve seat 68 is therefore reduced, thus decreasing the effective flow area of converging annular passageway 72. Conversely, as the temperature of the coolant fluid increases, sheath 50 expands more rapidly than the core assembly, thereby withdrawing the valve seat axially away from the valve member (to the right in FIGS. 2 and 3). This action increases the clearance between the opposing peripheral surfaces of the valve member and seat, thus increasing the effective flow area of converging passageway 72. The differential longitudinal contraction and expansion between the core assembly and sheath as just described is accompanied by differential diametric contraction and expansion between the expansion valve elements 62 and 64, which contributes to the temperature sensitivity of the converging passageway 72.

As noted earlier, the grooves 76, 77 cut into the surface of valve member 62 serve two particularly important purposes. First, the grooves act as labyrinth spoilers, causing degradation in the coolant fluid flow through the Joule-Thomson valve to enhance the pressure difference between the inlet and outlet sides of the valve. Second, the grooves act as catchment reservoirs for capturing contaminants contained in the coolant gas stream. The effect of the spoilers as catchment reservoirs is of substantial practical significance in that the expansion valve 60 is thereby rendered highly resistant to clogging by condensed contaminants. The resistance to blockage results in highly reliable long-term operation, making the invention especially suitable for applications in which maintenance requirements must be kept to a minimum. Additionally, because the design of valve 60 is less susceptible to blockage, the valve can operate with coolant gases of far lower purity than can be employed in conventional Joule-Thomson devices. The high purity requirements of conventional devices increase the costs of not only the coolant fluid, but of the entire associated cryogenic cooling system as well (due to the need for filtration, as well as other accommodations).

In practice of the invention, a number of grooves other than 2 may be employed depending upon the requirements of a given application. Indeed, for some applications adequate performance may be obtained without the grooves being present, as the converging annular passageway is itself more resistant to blockage than a circular expansion orifice. The presence of the grooves is contemplated as a general rule, however, due to the significant advantages which they provide.

Referring again to FIG. 2, in order that cryostat 30 may accommodate prescribed flow criteria for particular applications, holding means assembly 100 is adjustable so that core shaft 40 and sheath 50 may be held in selected relative axial positions. More particularly, assembly 100 permits adjustment of the positional relationship between respective ends 48 and 54 of the core and sheath opposite valve 60 in order to vary the clearance between the opposing peripheral surfaces of valve member 62 and valve seat 64. By varying the aforementioned clearance, the effective flow area of converging annular passageway 72 may be calibrated.

In the embodiment of FIG. 2, the adjustable means 100 includes an adapter member 102 which is of a generally tubular configuration and slidably received over the core extension 44. The adapter 102 has an eccentric bore 104 connecting an inlet end 35 of tubing 32 to a coolant fluid supply line 106, as shown. Adapter 102 further has a central bore with a forward end portion of enlarged diameter, as indicated at 108, wherein the end 54 of sheath 50 is secured. O-ring seals 110 are placed in corresponding circumferential grooves in extension 44 to provide a seal between the periphery of extension 44 and the inner peripheral surface of adapter 102 and thereby prevent coolant gas leakage past end 54 of sheath 50 along the opposed peripheral surfaces of core extension 44 and adapter 102.

Adapter 102 and core extension 44 have key and keyway means 112, 114 cooperable therebetween, the key 112 being in form of a pin which is partially inserted in a socket in core extension 44 and partially located in keyway 114 in adapter member 102. The key and keyway means 112, 114 permits relative longitudinal movement between core shaft 40 and adapter 102 but prevents relative rotational movement between these elements.

For effecting calibrating movement between core shaft 40 and sheath 50 (more specifically, valve member 62 and valve seat 64) an adjustment member 120 has a longitudinal bore 122 which threadably receives a threaded end pin 116 of core extension 44. Adjustment member 120 is also connected to adapter 102 by means of a retainer clip 118, which may be a C-clip, cooperable between opposing grooves in the internal periphery of adjustment member 120 and the external periphery of adapter 102, as shown. Adjustment member 120 functions as a turnbuckle, with C-clip 118 acting to permit rotation of the adjustment member about the axis of core shaft 40 and to maintain adapter 102 and adjustment member 120 in axially fixed relation.

To adjust converging annular passageway 72 for calibration, adjustment member 120 is rotated about the axis of core shaft 40. By virtue of C-clip 118, there is no axial displacement of adjustment member 120 relative to adapter 102. However, due to the threaded engagement of adjustment member 120 with core shaft extension 42 and the cooperation of key and keyway means 112, 114, the core shaft (specifically, extension 44) is caused to slide within adapter member 102. Because sheath 50 is fixedly secured to adapter 102 (and slidably received over the core shaft results in axial displacement of the core shaft 40 relative to sheath 50, thereby causing a corresponding change in clearance between valve member 62 and valve seat 64.

Once the desired setting of converging annular passageway 72 has been attained, the adjustment member 120 may be locked in place by means of a locking cap 124 which fits over a rear end of adjustment member 120, as shown. Locking cap 124 includes a central threaded plug 126 which threads into bore 122 from the rear. Locking cap 124 is rotated until plug 126 is threaded into endwise abutment with pin 116 of core extension 44, thus providing a locking effect. It will be apparent that the calibration assembly 100 offers the significant advantage of adjustability during operation of the cryostat 30.

Insofar as particular materials of construction are concerned, it will be apparent to those skilled in the art that many combinations of materials may be employed to implement the present invention. However, certain desirable characteristics for the various structural elements should be considered. For the frusto-conical valve member 62, a hard material, resistant to the erosive effects of the high speed gas flow through the converging annular passageway is desirable. The material for the valve member should also have a low coefficient of thermal expansion. Invar, a hard metal composed of 34% nickel and 66% iron, is exemplary of suitable materials for the valve member. For the main core section 42, a material having a low coefficient of thermal expansion and low thermal conductivity is desirable—for example, glass reinforced epoxy composites, one such composite being G-10 which is a thermosetting plastic with 10% glass fiber reinforcement. G-10 is readily available commercially, one source being Synthane-Taylor of Laverne, Calif. (which supplies this material under the designation G-10CR).

Regarding sheath 50, a high coefficient of thermal expansion and high thermal conductivity are desirable. 7075-T6 aluminum may be employed for both the sheath 50 and valve seat 64. The coefficient of expansion of this particular aluminum is relatively small, generally speaking, but the dimensional changes achievable with this material are significant within the fine tolerances employed in miniature Joule-Thomson expanders.

The basic components 102, 120, and 124 of the calibration assembly 100 may suitably be constructed of 303 stainless steel or the like, and it is therefore advantageous for core extension 44 to be made of the same material. More particularly, because stainless steel is more easily machined than G-10 to form the necessary features for coupling the core to the calibration assembly, the use of a separate core extension which is attached to the main core section can be advantageous. The O-ring seals 110 of the calibration assembly may be made of TEFLON.

Without limiting the invention, exemplary construction parameters which may be employed are as follows:

| | |
|---|---|
| Valve Member (Invar): | .412" total length |
| | .312" length base to free end |
| | .05" diameter at free end |
| | .09" diameter of base portion |
| | 9–10° apex angle |
| | 0–4 spoilers (.015" depth, .02" width) |
| Main Core Section: (G-10) | 1.66" length .09" diameter |
| Core Extension: (303 stainless steel) | .80" length .09" diameter |
| Sheath (7075-T6 Al): | 2.125" length |
| | .0935" inner diameter |
| | .113" outer diameter (.125" at enlarged end) |
| Valve Seat: (7075-T6 Al) | .235" length |
| | .0932" inner diameter converging to .05" |
| | 10° included angle |
| High Press. Adapter (7075-T6 Al) | .07" length .1135" inner diameter |
| Calib. Adapter Memb. (303 stainless steel) | .375" length .0935" inner diameter (.125" at enlarged end) |
| Adjustment Member (303 stainless steel) | .375" length 72 bore thread pitch |

For securing the various elements of cryostat 30 to one another, soft soldering is the preferred technique for strength and durability. However, the invention has been successfully implemented using other means of attaching the components, in particular, epoxy adhesive.

It will be appreciated, of course, that construction parameters may vary substantially from case to case, depending upon the requirements of particular applications. For example, for typical applications the apex angle defined by the converging peripheral surface of the frusto-conical valve member may be in the range from about 5° to about 30°, with the included angle of the converging peripheral surface of the valve seat being in the same range and generally complementary to the taper of the valve member. The larger angles will, of course, produce a greater change in the effective area of the converging annular passageway 72 for a given amount of contraction of sheath 50 relative to core assembly 40, 62. To prevent the opposing surfaces defining the passageway from sticking to one another upon complete closure of the valve (i.e., when the seat has been drawn over the valve member sufficiently to bring the opposing surfaces into contact), the apex angle of the valve member may advantageously be made up to about 1° less than the included angle of the valve seat, preferably at least about ¼° less.

Figure 4:
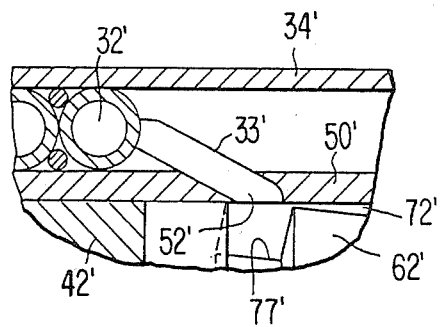
FIG. 4 is a fragmentary sectional view showing details of an alternative embodiment of the cryostat.
Figure 5:
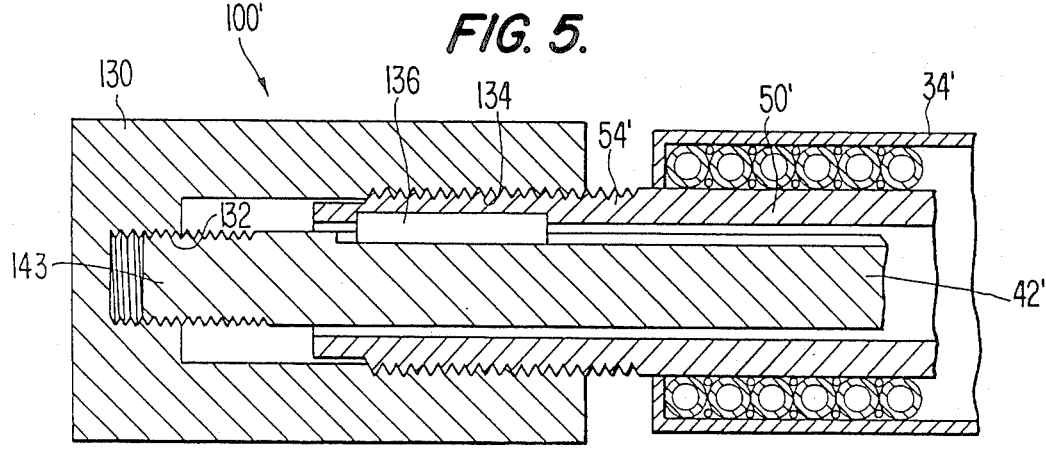
FIG. 5 is a fragmentary sectional view showing details of yet another embodiment of the cryostat.

Turning now to FIGS. 4 and 5, wherein elements corresponding to those in FIGS. 2 and 3 are indicated by corresponding reference numerals, two additional embodiments of the invention will now be described. FIGS. 4 and 5 respectively depict an alternative form of attachment of the coolant fluid supply tubing end to the Joule-Thomson expander and an alternative calibration mechanism for the expander.

In the apparatus of FIG. 4, the high pressure adapter 80 has been eliminated by direct connection of tube end 33′ to the Joule-Thomson expander. In particular, tube end 33′ is inserted into an opening 52′ in sheath 50′, the opening being aligned with a labyrinth spoiler groove 77′ to ensure even distribution of incoming coolant fluid into the upstream end of converging annular passageway 72′.

FIG. 5 depicts a differential thread type calibration mechanism 100′ according to the invention. In this embodiment, main core section 42′ (there is no core extension) has an end pin 143 externally threaded at a first pitch (e.g., 40 threads per inch), whereas sheath end 54′ is threaded externally at a different pitch (e.g., 39 threads per inch). The respective threads of core and sheath portions 143 and 54′ are threaded in the same rotational sense (e.g., both right-handed threads). An adjustment member 130 in the form of a thimble has threaded bores 132 and 134 which receive the ends of the core and sheath, respectively. The core and sheath are coupled by cooperable key and keyway means, indicated diagrammatically at 136, which permits relative axial movement between the core and sheath but prevents relative rotational movement therebetween. Hence, upon each full rotation of thimble 130 about the axis of the core shaft, the core shaft and sheath are axially displaced relative to one another by an amount equal to the difference in the respective thread pitches of the two members—here, 0.02564″ (1/39″) less 0.025″ (1/40″) or 0.00064″. It will be appreciated that the foregoing calibration assembly 100′ is adjustable during operation of the associated cryostat.

While the invention has hereinabove been described in connection with several preferred embodiments, it will be apparent to those skilled in the art that various changes and modifications are possible consistent with the principles of the invention, the scope of which is defined in the appended claims. Within its broader range of applicability, exemplary practical uses of the invention could include condensation of vapor boil-off from liquid hydrogen and oxygen fuel supplies stored on spacecraft in insulated dewar vessels at cryogenic temperatures, and the liquefaction of helium and nitrogen for conventional industrial, medical, research, and defense applications.

In comparative tests (using nitrogen) of prototype cryostats in accordance with the invention against a conventional fixed orifice type cryostat, the devices according to the invention exhibited rapid cool-down and smooth temperature regulation and achieved hours of continuous operation without blockage by condensed contaminants. The conventional device, on the other hand, required substantially greater cool-down time, was poorly temperature regulated, and experienced blockage by condensed contaminants in as little as 6–60 minutes of continuous operation depending on test conditions. Devices in accordance with the invention have tested successfully under a variety of conditions, including inlet gas pressures of 1000–3000 psi and initial gas flow rates of 15–30 lpm, with typical cool-down periods being on the order of only one minute.

The invention claimed is:

1. In a refrigeration system in which a refrigerant fluid is compressed and subsequently expanded to effect cooling, a refrigerant expansion device including means defining an annular passageway having an upstream end into which said refrigerant fluid is introduced under pressure and a downstream end terminating at an annular expansion opening through which the introduced fluid is expanded, said passageway being subject to the accumulation therein of condensed contaminants from said refrigerant fluid, and means disposed adjacent said passageway upstream from said expansion opening for capturing said condensed contaminants such that said passageway does not become blocked by said condensed contaminants.

2. A refrigerant expansion device according to claim 1, wherein said passageway is tapered from said upstream end to said downstream end.

3. A refrigerant expansion device according to claim 2, wherein said passageway is tapered convergently.

4. A refrigerant expansion device according to claim 1, wherein said capturing means includes means defining a recess adjacent to and in communication with said passageway.

5. A refrigerant expansion device according to claim 4, wherein said recess extends about a circumference of said passageway.

6. A refrigerant expansion device according to claim 5, wherein said circumference is an inner circumference of said passageway.

7. A refrigerant expansion device according to claim 5, wherein said recess is disposed intermediate said upstream end and said downstream end.

8. A refrigerant expansion device according to claim 4, wherein said recess is in the form of a groove which extends lengthwise transverse to the axis of said passageway.

9. Cryogenic cooling apparatus, comprising a Joule-Thomson expansion device including an inner member and an outer member surrounding said inner member, with an outer peripheral surface of said inner member and an inner peripheral surface of said outer member defining an annular passageway having an inlet toward an upstream end of said passageway into which refrigerant fluid is to be introduced under pressure and an annular outlet opening at a downstream end of said passageway through which the introduced refrigerant fluid is to be expanded, and including recess means formed upstream from said outlet opening in the respective peripheral surface of at least one of said members for capturing contaminants which condense out of the refrigerant fluid, thereby to inhibit blockage of said passageway by the condensed contaminants.

10. Apparatus according to claim 9, wherein said recess means comprises at least one circumferential groove.

11. Apparatus according to claim 10, wherein said circumferential groove is formed on said inner member.

12. Apparatus according to claim 11, wherein said circumferential groove is cut substantially perpendicular to said outer peripheral surface of said inner member.

13. Apparatus according to claim 9, wherein said passageway is tapered.

14. Apparatus according to claim 9, wherein said inner member and said outer member are supported by respective members having different thermal coefficients of expansion.

15. In a refrigerant expansion device in which a refrigerant fluid flows along a surface to an expansion opening through which the refrigerant fluid is to be expanded, the improvement wherein said surface has recess means formed therein upstream from said expansion opening for capturing condensed contaminants from said refrigerant fluid as said fluid passes along said surface and thereby inhibiting blockage of flow of said refrigerant fluid to said expansion opening.

16. The improvement of claim 15, wherein said surface is a wall of a passageway through which said fluid flows toward said expansion opening.

17. The improvement of claim 16, wherein said recess means comprises a groove.

18. The improvement of claim 16, wherein said passageway is annular and wherein said wall is an inner peripheral wall of said passageway.

19. The improvement of claim 16, wherein said passageway is tapered.

20. The improvement of claim 15, wherein said recess means comprises a groove.

21. The improvement of claim 20, wherein said groove extends lengthwise transverse to the direction of fluid flow along said surface.

* * * * *